Sept. 28, 1943.   C. J. SMITH   2,330,453
GAUGE
Filed Aug. 27, 1942   2 Sheets-Sheet 1
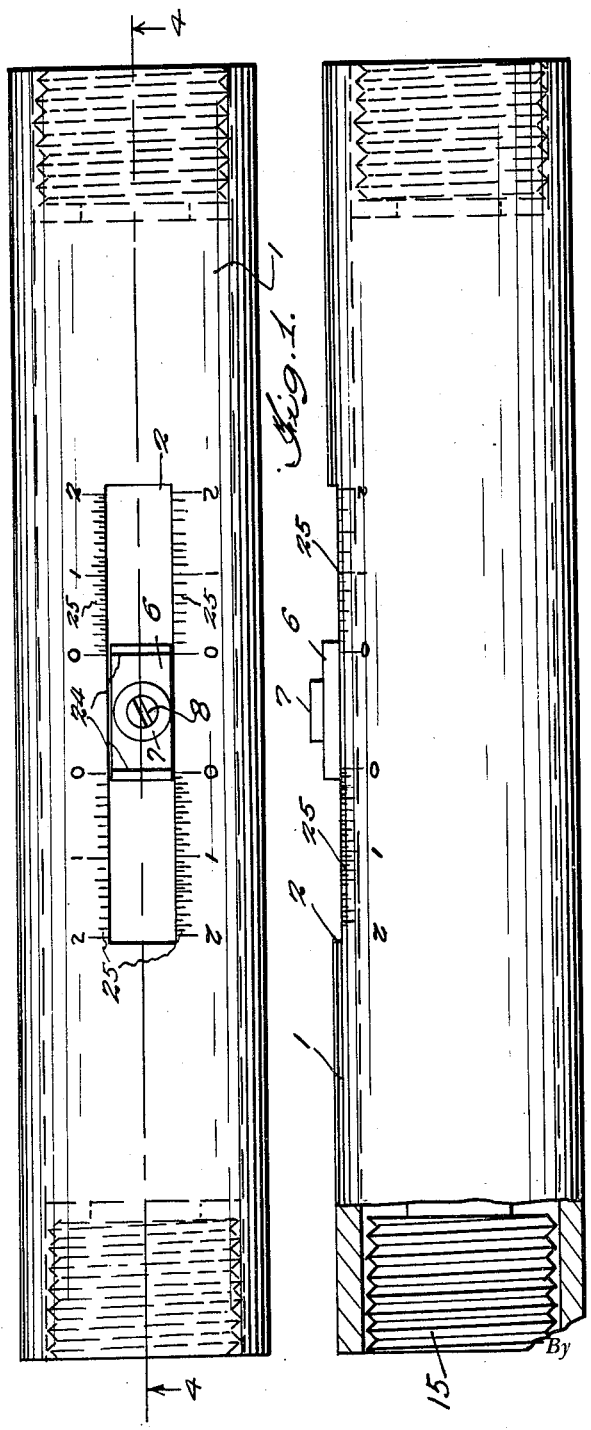
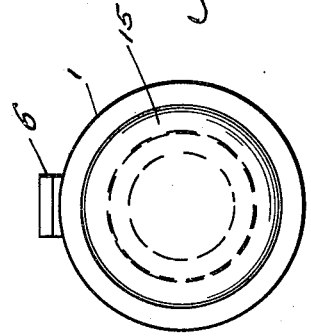
Inventor
Charles Joseph Smith
By Clarence A. O'Brien
and Harvey B. Jacobson
Attorneys Sept. 28, 1943.  C. J. SMITH  2,330,453
GAUGE
Filed Aug. 27, 1942  2 Sheets-Sheet 2
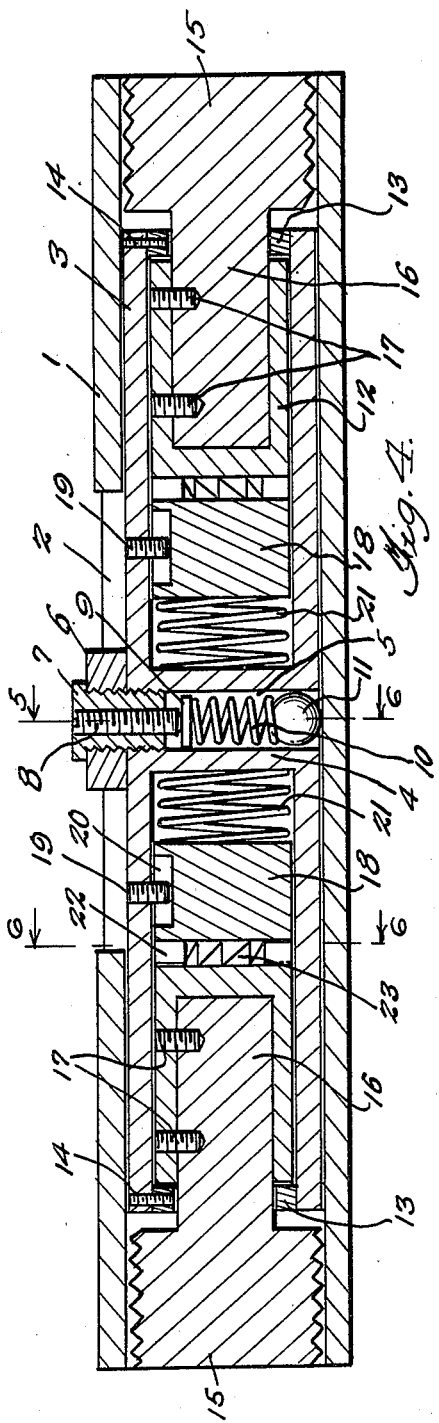
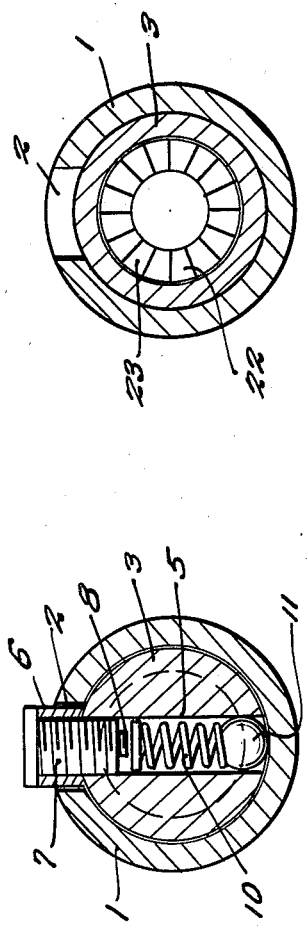
Inventor
Charles Joseph Smith
By Clarence A. O'Brien
and Harvey B. Jacobson
Attorneys Patented Sept. 28, 1943

2,330,453

UNITED STATES PATENT OFFICE 2,330,453

GAUGE

Charles Joseph Smith, Schenectady, N. Y.

Application August 27, 1942, Serial No. 456,393

3 Claims. (Cl. 33—199)

My invention relates to improvements in depth gauges for measuring threaded bores or holes, and the principal object in view is to provide a simply constructed, easily manipulated device of, this character adapted for quickly and accurately gauging and indicating the depths of bores having internal threads of relatively different pitch.

Other and subordinate objects are also comprehended by my invention, all of which, together with the precise nature of my improvements, will be readily understood when the succeeding description and claims are read with reference to the drawings accompanying and forming part of this specification.

In said drawings:

Figure 1 is a view in top plan of a depth gauge constructed in accordance with my invention, Figure 2 is a view in side elevation partly broken away and shown in section, Figure 3 is a view in end elevation, Figure 4 is a view in longitudinal section taken on the line 4—4 of Figure 1, Figure 5 is a view in transverse section taken on the line 5—5 of Figure 4, and Figure 6 is a similar view taken on the line 6—6 of Figure 4.

Referring to the drawings by numerals, my improved depth gauge comprises, as its basic element, an outer tubular casing 1 provided with a central, longitudinally extending slot 2 therein, an inner shorter tubular section 3 provided with a central, diametrical web 4 having a diametrical bore 5 extending through the web. The section 3 is endwise slidable in the casing.

A preferably rectangular key-lock 6, slidably fitting lengthwise in the slot 2 and projecting slightly out of the same is detachably secured to the section 3 in the transverse center thereof by means of a headed, axially bored screw 7 threaded through the center of the block 6 and into one end of said bore 5. A stud screw 8 turned into the bore 5 of the screw 7 bears against a washer 9 in said bore 5 to variably tension a coil spring 10 provided in said bore 5 and backing a ball clutch member 11 fitted in said bore to frictionally engage and ride on the inner circumferential wall of the casing 1 so that the inner section 3 is frictionally locked to the casing 1 when slid into different positions.

A pair of cylindrical socket members 12 having open outer ends and closed inner ends are fitted in the opposite ends of the inner section 3, respectively, for rotary and sliding movement therein. A pair of keeper rings 13 fixed in the outer ends of the socket members 12, respectively, by screws 14 confine said members 12 in said section 3 and limit outward movement of the same.

A pair of externally threaded, male depth gauge plugs 15 fitting in the opposite ends of the casing 1 are secured in the socket members 12 to extend outwardly of the same and by means of shanks 16 thereon fitting in said members 12 and fixed therein by stud screws 17 extending through said members in said shanks 16.

The length of the section 3 and arrangement of the plugs 15 is such that when the section 3 is centered longitudinally in the casing 1, the plugs 15 are withdrawn into the ends of said casing for projection therefrom by sliding of said section in opposite directions, respectively. The threads on the plugs 15 are of different pitch to fit differently threaded bores, or holes, and, as will be understood, the plugs 15 may be replaced with others of different threaded pitch as occasion may require.

Fitted in the inner section 3 for longitudinal sliding therein is a pair of cylindrical followers 18 for the socket members 12, respectively, arranged between the inner ends of the latter and the web 4 on opposite sides of the latter. Stud screws 19 extending through the section 3 into longitudinal peripheral slots 20 in said followers 18 spline the latter to said section 3 for limited longitudinal sliding movement therein. A pair of coil springs 21 interposed in the section 3 between the opposite sides of the web 4 and said followers 18 urge the followers toward said members 12.

Exterior ratchet teeth 22 are provided on the inner ends of the socket members 12 in circular series, and complemental ratchet teeth 23 on the opposite ends of the followers 18. The ratchet teeth 22, 23 are arranged so that when either gauge plug 15 is entered into a bore, or hole, and the casing 1 rotated by hand in the proper direction to turn the selected plug into said bore, or hole, the teeth 23 on the socket member of the selected plug and on the follower therefor will ratchet over each other in opposition to the spring 21, when the selected plug 15 reaches the bottom of the bore, or hole, and, under reverse turning of the casing 1, said teeth 22, 23 will interlock to clutch the follower 18 to the socket member 12 positively so that the selected plug may be positively turned out of the bore or hole.

The key block 6 is provided adjacent each end thereof with a transverse gauge line 24 designed to register, when the inner section is centered longitudinally in the casing 1, with zero graduations of inch scales 25 suitably marked on the casing 1 and extending along opposite sides of the slot 2, said scales being numbered in increasing numerical order toward the ends of the slot 2, and directly opposite scales being graduated in eighths and sixteenths of an inch.

As will be readily apparent, the slide block 6 may be manipulated with the thumb of the hand to slide either gauge plug 15 out of the casing 1 for turning into a bore, or hole, in the manner already described, and during such turning the adjacent end of the casing 1 would bear against the surface around the hole or bore so that said block will slide along the slot 2 and appropriate scale to indicate by registration of the gauge line 24 with a graduation on one of the scales the depth of the bore or hole in inches or fractions thereof.

The foregoing will, it is believed, suffice to impart a clear understanding of my invention, since the use and operation has been set forth in connection with the description of parts.

Manifestly, the invention, as described, is susceptible of modification without departing from the inventive concept, and right is herein reserved to such modifications as fall within the scope of the subjoined claims.

What I claim is:

1. A device for depth gauging threaded bores comprising a tubular casing, having a central longitudinal slot therein, a relatively shorter inner tubular section endwise slidable in said casing, a slide block fixed to said section in the transverse center thereof and slidably fitted in said slot for use as a thumbpiece manipulative to slide said section in the casing in limited degree in opposite directions, respectively, said block splining said section to the casing for unitary rotation of the casing and section by hand, a cylindrical externally threaded gauge plug mounted in one end of said section for projection out of the casing by sliding of said section in one direction and to be turned into bores to be gauged under rotation of said casing and section in one direction, and one way ratchet connections between said section and plug forming a friction clutch, when said casing and section are rotated in said one direction and a positive interlocking clutch under rotation of said casing and section in the opposite direction.

2. A device for depth gauging threaded bores comprising a tubular casing, having a central longitudinal slot therein, a relatively shorter inner tubular section endwise slidable in said casing, a slide block fixed to said section in the transverse center thereof and slidably fitted in said slot for use as a thumbpiece manipulative to slide said section in the casing in limited degree in opposite directions, respectively, said block splining said section to the casing for unitary rotation of the casing and section by hand, a cylindrical externally threaded gauge plug mounted in one end of said section for projection out of the casing by sliding of said section in one direction and to be turned into bores to be gauged under rotation of said casing and section in one direction, and one way ratchet connections between said section and plug forming a friction clutch, when said casing and section are rotated in said one direction and a positive interlocking clutch under rotation of said casing and section in the opposite direction, said mounting comprising a socket member fitted in one end of the section, and said connections comprising a spring-pressed follower in said section splined thereto, and ratchet teeth on said follower and socket member, respectively.

3. A device for depth gauging threaded bores comprising a tubular casing, having a central longitudinal slot therein, a relatively shorter inner tubular section endwise slidable in said casing, a slide block fixed to said section in the transverse center thereof and slidably fitted in said slot for use as a thumbpiece manipulative to slide said section in the casing in limited degree in opposite directions, respectively, said block splining said section to the casing for unitary rotation of the casing and section by hand, a cylindrical externally threaded gauge plug mounted in one end of said section for projection out of the casing by sliding of said section in one direction and to be turned into bores to be gauged under rotation of said casing and section in one direction, and one way ratchet connections between said section and plug forming a friction clutch, when said casing and section are rotated in said one direction and positive interlocking clutch under rotation of said casing and section in the opposite direction, said casing being provided with inch scales thereon at opposite sides of said slot and said clock having gauge marks therein for registration with said scales to indicate a centered position of the section in said casing and the degree of sliding movement of the section from said position whereby the depth to which the plug has been turned into bores is measured.

CHARLES JOSEPH SMITH.